(12) United States Patent
Lizell et al.

(10) Patent No.: US 10,988,149 B2
(45) Date of Patent: Apr. 27, 2021

(54) ENERGY ABSORPTION DEVICE AND METHOD

(71) Applicant: DELLNER DAMPERS AB, Flen (SE)

(72) Inventors: Magnus Lizell, Lidingö (SE); Trygve Engelbert, Stockholm (SE)

(73) Assignee: Dellner Dampers AB, Flen (SE)

( * ) Notice: Subject to any disclaimer, the term of this patent is extended or adjusted under 35 U.S.C. 154(b) by 225 days.

(21) Appl. No.: 15/779,980

(22) PCT Filed: Nov. 28, 2016

(86) PCT No.: PCT/EP2016/078928
§ 371 (c)(1),
(2) Date: May 30, 2018

(87) PCT Pub. No.: WO2017/093153
PCT Pub. Date: Jun. 8, 2017

(65) Prior Publication Data
US 2018/0346001 A1    Dec. 6, 2018

(30) Foreign Application Priority Data

Nov. 30, 2015   (EP) .................................. 15197089

(51) Int. Cl.
*B61G 11/16*   (2006.01)
*F16F 7/12*   (2006.01)

(52) U.S. Cl.
CPC .............. *B61G 11/16* (2013.01); *F16F 7/128* (2013.01); *F16F 2224/0208* (2013.01); *F16F 2226/04* (2013.01)

(58) Field of Classification Search
CPC ... B61G 11/16; B61G 7/10; B61G 7/14; F16F 2224/0208; F16F 2226/04; F16F 7/128
See application file for complete search history.

(56) References Cited

U.S. PATENT DOCUMENTS

| | | | | |
|---|---|---|---|---|
| 3,603,626 A | * | 9/1971 | Whiteside | ............. F16B 35/041 403/408.1 |
| 3,819,218 A | * | 6/1974 | Liu | ......................... B60R 19/34 293/133 |
| 5,456,100 A | * | 10/1995 | Loomis | .................... B21J 13/14 470/152 |
| 7,455,154 B2 | | 11/2008 | Bantle et al. | |

(Continued)

FOREIGN PATENT DOCUMENTS

| CN | 85101367 A | 1/1987 |
|---|---|---|
| CN | 1079341 C | 2/2002 |

(Continued)

OTHER PUBLICATIONS

Second Notification of Office Action dated Jan. 19, 2020, issued in corresponding Chinese Patent Application No. 201680078241.5.

(Continued)

*Primary Examiner* — Mark T Le
(74) *Attorney, Agent, or Firm* — Morgan, Lewis & Bockius LLP

(57) ABSTRACT

An energy absorption device absorbs energy that is released upon impact between two objects in relative motion. An exceptional load applied to any of the two objects results in acceleration of one object relative to the other object. The acceleration energy is absorbed by deformation of an element or elements that are put under stress from the objects upon impact. The process of deformation includes a controlled diameter reduction during a forced elongation of a semi-solid or solid deformation bolt made from a cold-formed material in the direction of force generated from the acceleration.

21 Claims, 3 Drawing Sheets

(56) References Cited

U.S. PATENT DOCUMENTS

Figure 1A:
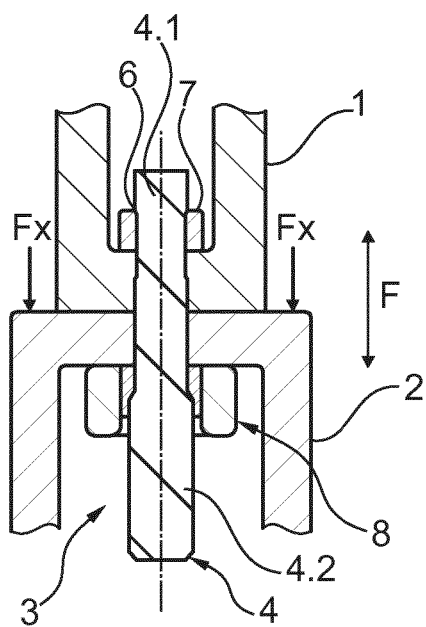

| | | |
|---|---|---|
| 2009/0008963 A1 | 1/2009 | Lindner |
| 2009/0065462 A1 | 3/2009 | Gansweidt |
| 2012/0199454 A1 | 8/2012 | Guillot et al. |
| 2015/0069003 A1 | 3/2015 | Watts et al. |

FOREIGN PATENT DOCUMENTS

| | | | |
|---|---|---|---|
| CN | 1854556 | A | 11/2006 |
| CN | 202294855 | U | 7/2012 |
| CN | 103534144 | A | 1/2014 |
| DE | 60201141 | T2 | 10/2005 |
| EP | 0 608 531 | A1 | 8/1994 |
| EP | 1247716 | B1 | 9/2004 |
| EP | 1 905 661 | A1 | 4/2008 |
| EP | 1 990 251 | A1 | 11/2008 |
| EP | 2 700 556 | A1 | 2/2014 |
| EP | 2 845 784 | A1 | 3/2015 |
| RU | 2 141 584 | C1 | 11/1999 |
| RU | 2 574 508 | C2 | 4/2014 |
| WO | 2005/075272 | A1 | 8/2005 |
| WO | WO 2012/171714 | * | 12/2012 |
| WO | 2015/128850 | A1 | 9/2015 |

OTHER PUBLICATIONS

Search Report dated Jan. 28, 2020, issued in corresponding Russian Patent Application No. 2018121759/11.
Chinese Office Action and Search Report dated Jun. 4, 2019 issued in CN Patent Application 201680078241.5 (with English Translation).

* cited by examiner

ENERGY ABSORPTION DEVICE AND METHOD

TECHNICAL FIELD OF THE INVENTION

The present invention relates to a device and a method for absorption of energy that is released upon impact between two objects in relative motion. In a specific aspect the present invention relates to a train coupler wherein the energy absorption device and method are implemented.

BACKGROUND AND PRIOR ART

Energy absorption devices are previously known, for example as structural parts of train couplers intended for coupling rail vehicles which are connected in series to move together in common motion and direction, wherein an exceptional load applied to any of the interlinked vehicles, such as a shock load applied in a crash fall e.g., results in acceleration of said vehicle relative to the other vehicle, and wherein for retardation of said acceleration energy is absorbed in the process of deformation of an element or elements included in said train coupler.

In its structurally most simple form an energy absorption device for a train coupler can be realized as a shear out element that provides connection between those parts of the coupler which give away under the exceptional load, and those parts which remain stationary connected to the vehicle chassis. The use of shear out bolts can be found in EP 2 700 556 A1, e.g.

An energy absorption device for train couplers is previously known in the form of a deformation tube which is arranged to absorb energy during a radial collapse of the deformation tube as the same is forced through a conical mouth, the smallest diameter of which is less than the outer diameter of the deformation tube. An example of this approach can be found in EP 0 608 531 A1, e.g.

A variant of the aforesaid solution is the inverted design wherein the deformation tube is radially expanded as a mandrel with a conical end piece and an outer diameter which is larger than the inner diameter of the deformation tube is forced through the deformation tube. An example of that approach can be found in WO 2005 075272 A1, e.g.

SUMMARY OF THE INVENTION

An object of the present invention is to provide an energy absorption method and device of alternative and improved design which can be implemented in a train coupler, and which also has a general use for absorption of energy that is released upon impact between any two objects in relative motion.

In this context, objects in relative motion shall be understood to include objects moving in opposite directions, or objects moving at different speeds in the same direction, or objects only one of which is moving relative to the other object which can be stationary. When used herein, objects in common motion refers to objects that are interlinked in series for motion in the same direction.

The object is met in a method, a device and in a train coupler respectively as defined in the appending claims.

In a first aspect, briefly, the present invention relates to a method for absorption of energy that is released upon impact between two objects in relative motion, wherein an exceptional load applied to any of the two objects results in acceleration of said object relative to the other object, and wherein for retardation of said acceleration energy is absorbed in the process of deformation of an element or elements which are put under stress from the objects upon impact. According to the present invention the process of deformation comprises a controlled diameter reduction during a forced elongation of a semi-solid or solid deformation bolt made of cold-forming material in the direction of force generated in said acceleration.

In a second aspect the present invention briefly relates to an energy absorption device comprising a semi-solid or solid deformation bolt made of cold-forming material with a taper section adapted to be seated in a through hole that is formed in a hard metal ring.

In a third aspect, briefly, the present invention relates to a coupler suitable for coupling rail vehicles which in interlinked state move together in common motion and direction, wherein an exceptional load applied to the coupler results in acceleration of the coupler or parts thereof relative to a vehicle, and wherein for retardation of said acceleration energy is absorbed in the process of deformation of an element or elements included in the coupler. According to the present invention, the energy absorption element or elements comprises at least one combination of a semi-solid or solid deformation bolt made of cold-forming material with a taper section seated in a through hole that is formed in a hard metal ring.

A technical effect achieved by the present invention is the ability of the energy absorption device to absorb energy that is released in a crash fall, and by absorbing at least part of that energy avoiding or reducing damage to structures, vehicles and passengers.

Another technical effect achieved by the present invention is a substantially continuous energy absorption capacity to be obtained during the full length of the deformation stroke.

Yet another technical effect achieved by the present invention is a reduced mounting space requirement, i.e. in relation to collapsible tubes.

The reduced mounting space requirement leads to an increased versatility in the design of neighbouring structures and dimensioning of energy absorption capacity, as well as a greater freedom of installation.

Still another technical effect provided by the present invention is the minimum tolerances in dimensions being the result of forming one part of the device, i.e. the deformation bolt, in a cold forming process using the other part of the device, i.e. the ring acting as extrusion die.

The recited controlled production with minimum tolerances adds to security and reduces the risk of incorrect mounting of the energy absorption device.

Characterizing features of advantageous and preferred embodiments of the method, device and train coupler respectively are listed in the subordinated claims.

SHORT DESCRIPTION OF THE DRAWINGS

Figure 1B:
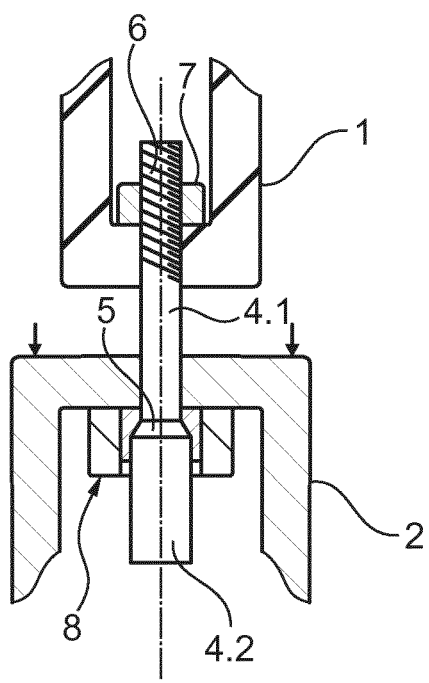
Figure 2A:
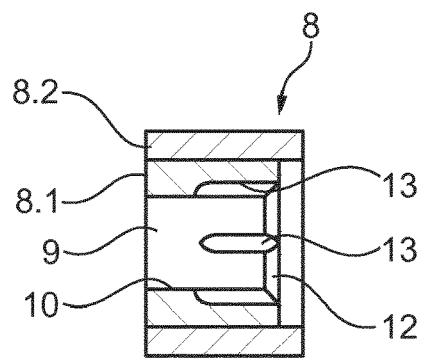
Figure 2B:
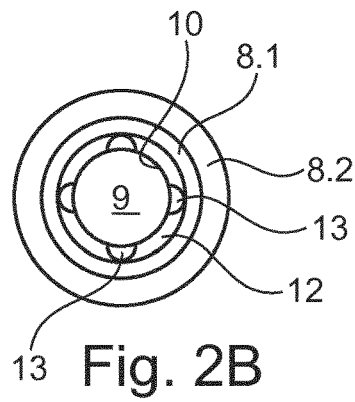
Figure 3:
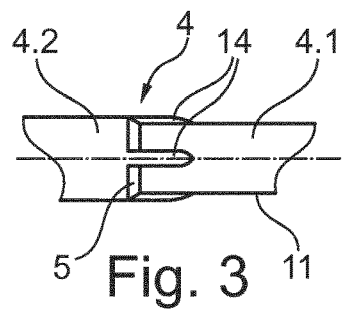
Figure 4:
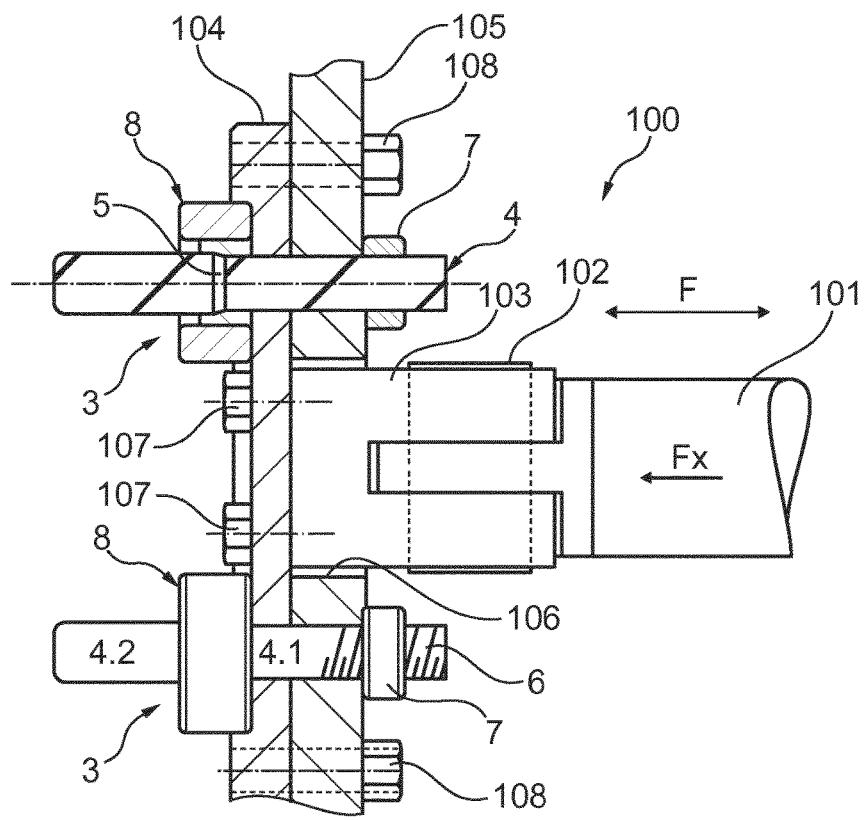
Figure 5:
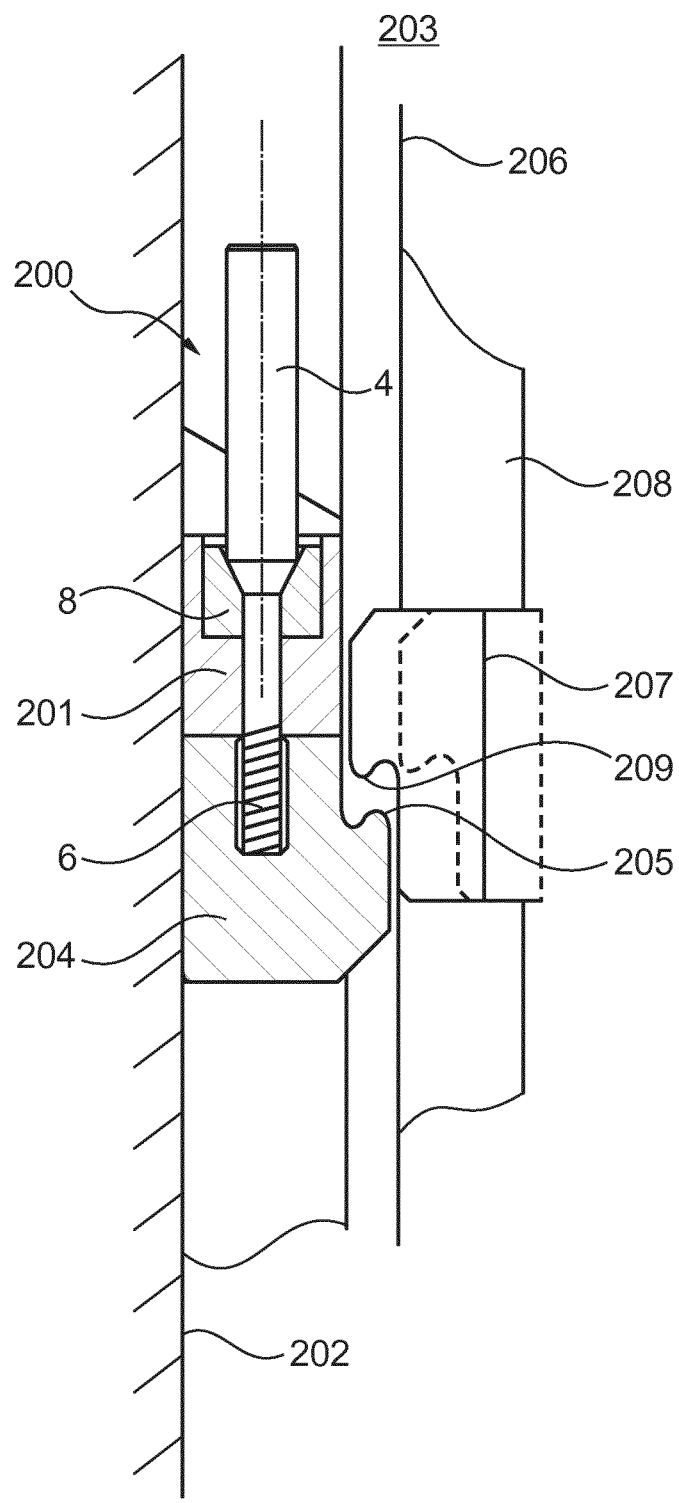

Embodiments of the invention will be explained in more detail below with reference made to the accompanying schematic drawings, wherein FIGS. 1A and 1B illustrate in two steps the method for absorption of energy by means of an energy absorption device according to the present invention, FIGS. 2A and 2B illustrate a ring included in the energy absorption device, in longitudinal section and in an end view respectively, FIG. 3 is a broken away elevational view showing a central portion of a bolt included in the energy absorption device, FIG. 4 is a broken away, partially sectioned view showing a train coupler incorporating the energy absorption device and method of the present invention, and FIG. 5 is a partially sectioned, broken away view illustrating another implementation of the energy absorption device of the present invention.

DETAILED DESCRIPTION OF PREFERRED EMBODIMENTS

FIGS. 1A and B illustrate the process of energy absorption through a controlled diameter reduction during a forced elongation of a deformation bolt made of cold-forming material. In the drawings, reference numbers 1 and 2 refer to first and second objects which are in this case interlinked to move together in common motion and in any of two directions indicated by the arrow F. Although schematically drawn it should be understood that the objects 1 and 2 are symbolic representations for any arbitrary pair of rail or road vehicles, vessels or structural elements incorporated in such vehicles, vessels or other objects that are coupled in series for movement together in either direction F.

With reference also to FIGS. 2 and 3 the objects 1 and 2 are interlinked through a bolt and nut connection forming an energy absorption device, in the drawings generally referred to by reference number 3. The energy absorption device 3 comprises a bolt 4 which has a first bolt length 4.1 having a first diameter adjoining, via a taper section 5, a second bolt length 4.2 having a second diameter which is larger than the first diameter. The bolt 4 is made of cold forming material, and at least the first bolt length 4.1 and the taper section 5 may be formed by extrusion in a cold-forming process.

In one end of the bolt 4, the bolt length 4.1 of lesser diameter is formed externally with a thread 6 for threaded engagement with a nut 7. In tightened position on the bolt the nut fixates the bolt relative to the first object 1.

The energy absorption device 3 further comprises a ring 8 which is formed with a tapering through-hole 9. The ring 8 has an inner diameter 10 corresponding to the outer diameter 11 of the bolt length 4.1 of smaller dimension, the tapering portion 12 of the inner diameter of the ring 8 mating with the diameter of the taper section 5 of the bolt. Upon connecting the objects 1-2 the bolt 4 is inserted in the ring 8 until the taper section 5 on the bolt rests form-fittingly against the tapering portion 12 on the ring. In other words, the ring 8 forms a seat 8 for the bolt 4. In connected mode the objects 1 and 2 are thus clamped between the nut 7 and the ring 8 which is arrested against the taper section 5 on the bolt 4 as illustrated in FIG. 1A.

While FIG. 1A on one hand shows the relation between the objects 1 and 2 and the components of the energy absorption device 3 in motion under normal load, FIG. 1B on the other hand shows the same elements and components in the process of retardation of an acceleration of object 2 relative to object 1.

This acceleration is the result of an exceptional load FX being applied to object 2. If the exceptional load FX is sufficient to cause separation of object 2 from object 1, such as in a crash fall e.g., at least some of the energy released is absorbed and transferred into heat and work resulting in a deformation of the bolt 4. The bolt 4 undergoes a controlled diameter reduction under a forced elongation of the bolt in the direction F of the force that is generated by the exceptional load FX.

To this end the bolt 4 is made from alloy steel of a composition which makes the material suitable for absorption of energy through deformation in a cold forming process. A steel suitable for the purpose is a temper-hardened steel that has high tensile strength and provides high elongation before break at cold forming temperature. One example of a suitable steel quality that is available in the commerce is the 34CrNiMo6 (European standard EN 10083) as hardened to provide a tensile strength of minimum 900 N/mm$^2$ in dimensions up to 250 mm (corresponding to previous Swedish standard quality 2541-03). It should be understood that other qualities of neighbouring properties are considerable for embodiments of the bolt, and that each implementation of the energy absorption device requires its own choice of dimensions and steel quality for the specific implementation.

In the energy absorption and deformation process the taper section 5 of the bolt 4 is displaced by the ring 8 into the bolt length 4.2 of larger diameter, thus extending the bolt length 4.1 of lesser diameter while reducing the bolt length 4.2 of larger diameter. Explained in other words, the diameter of the deformed portion of the bolt length 4.2 is reduced to the diameter of the bolt length 4.1 while simultaneously the overall length of the bolt is increased. Thus in the process of energy absorption the bolt undergoes a plastic deformation which can be characterized as a conversion of diameter into length without loss of material or strength. The character of this process distinguishes the energy absorption device and method of the present invention from the prior art of shear out bolts and radially collapsing tubes.

The bolt 4 is an elongate, solid or semi-solid element. In some embodiments it may be preferred to realize the bolt in the form of a solid bar having a homogenous and continuous circular section. However, in some embodiments or applications it may be preferred to vary the energy absorption properties in the length of the bolt. Thus instead of providing a continuous bolt diameter, the diameter of the wider bolt length 4.2 can be made slightly conical with a diameter dimension that is growing from the taper section 5 towards the end of the bolt. Other alternatives include, e.g., forming local variations in the diameter or forming bulges on the wider bolt length 4.2.

In still other cases it may be desired to remove material from the centre of the bolt, such as for reducing its weight e.g. In such case a hollow centre need not extend the whole length of the bolt but may instead be formed as a blind hole. In either case the inner diameter of a hollow centre or blind hole should be carefully balanced to the outer dimension of the bolt in order not to danger the integrity of the remaining bolt wall and thus lose the character of deformation as explained above. As a rule of thumb and non-limiting example the inner diameter of a hollow centre or blind hole should, in appropriate cases, not exceed ½ of the diameter of the bolt. In other embodiments it may be preferred to limit the hollow centre or blind hole to an inner diameter of ⅓ or less of the diameter of the bolt in order to secure the integrity of the wall of the bolt during deformation. It thus seems appropriate to characterize the bolt 4 as a solid or semi-solid element.

The ring 8 acts as a drawing matrix or extrusion die as it travels down the bolt in the energy absorption process. To this purpose the ring 8 comprises a hard metal insert 8.1 which can be supported in an insert holder 8.2 (see FIGS. 2A and B). The insert 8.1 may be produced in high-tensile steel, whereas the insert holder 8.2 can be made of other steel quality, if appropriate.

With further reference to FIGS. 2A and 2B the ring 8, or more precisely the hard metal insert 8.1, is formed on its inner diameter with a number of radial indentations 13. The indentations 13 extend for at least a part of the axial length of the ring 8, mouthing in the tapering portion 12 in the forward end of the ring (i.e. the end that faces the taper section 5 on the bolt 4). When pressed onto the bolt 4, in a preforming process, these indentations 13 in the inner diameter of the ring form a corresponding number of radial protrusions 14 that rise above the surface of the bolt length 4.1 of lesser diameter, as can be seen in FIG. 3. The radial engagement between the protrusions 14 on the bolt and the indentations 13 in the ring forms a means to prevent rotation of the bolt 4 relative to the ring 8 as the nut 7 is tightened for fixation of the bolt to the first object 1.

FIG. 4 shows an embodiment of the energy absorption device 3 installed in a train coupler. In the drawing the train coupler is generally denoted by reference number 100. The train coupler 100 is intended to form a connection between rail vehicles (not shown) connected in series and in interlinked state moving together in one of the two directions indicated by the arrow F in FIG. 4.

The train coupler 100 comprises a drawbar 101 which is pivotally attached to a rail vehicle chassis (not shown) via a pivot axle 102 that is journaled in a pivot bracket 103. The pivot bracket 103 is via a yoke element 104 supported in a mounting plate 105 which forms a part of the vehicle chassis or is attached to the same near an end of the vehicle. The pivot bracket 103 extends through a hole 106 in the mounting plate for a bolted connection 107 with the yoke on the rear face of the mounting plate 105. The yoke 104 can be bolted to the rear face of the mounting plate 105 by means of shear out bolts 108.

Although any number of energy absorption devices 3 can be installed in the coupler 100 to provide a desired energy absorption capacity, at least two energy absorption devices 3 may be installed one on each opposite sides of the through-hole 106 in the mounting plate 105. A total of four energy absorption devices 3 may alternatively and preferably by arranged in the train coupler 100, evenly distributed around the through-hole 106.

In each case the bolt 4 of the energy absorption device 3 extends through the yoke and through the mounting plate to be secured by the nut 7 on the front face of the mounting plate 105. On the rear side of the yoke 104, the hard metal ring 8 is secured in clamped condition between the rear face of the yoke and the taper section 5 of the bolt 4. The ring 8 may be fixed in the yoke through a form-fitting engagement that prevents rotation of the ring and the bolt as the nut 7 is tightened towards the mounting plate.

In the event of an exceptional load FX being applied to the train coupler 100 to the extent that the shear out bolts 108 become ruptured, the pivot bracket will get displaced in the direction FX thus pushing the yoke 104 and the rings 8 in a deformation stroke which absorbs at least some of the energy that remains after shear out of the bolts 108.

In this connection it should be pointed out that the exceptional load which causes activation of the energy absorption device 3 is typically the result of an impact or crash that releases more of energy than what can be consumed by other regenerative energy absorption devices, such as springs and dampers, which are usually installed in the subject type of couplers. It shall also be pointed out that the exceptional load which causes acceleration of the coupler relative to a vehicle and thus activates the energy absorption device may be applied to couplers in coupling mode between vehicles, as well as to couplers in non-coupling mode such as the front or aft coupler of the first and last vehicles in a train, e.g.

From the above illustrated description of the coupler it will be realized by those skilled in the art, that the energy absorption combination comprising the deformation bolt 4 and hard metal ring 8 can be alternatively installed in the coupler 100. More precisely, in an inverted design (not shown in drawings) the bolt 4 can be secured by the nut 7 on the rear face of the yoke 104, such that the taper section 5 and the wider bolt length 4.2 extend on the front side of the mounting plate 105. In such case the hard metal ring 8 will be supported on the front face of the mounting plate, clamped between the mounting plate 105 and the taper section 5 on the bolt 4. In either case, the deformation bolt 4 is fixedly mounted in relation to one of the mounting plate 105 and the pivot bracket 103, and the ring 8 is fixedly mounted in relation to the other one of the mounting plate 105 and the pivot bracket 103.

EXAMPLE

The energy absorption device 3 has been put to test on laboratory scale. A solid bolt made of the aforementioned alloy steel SIS 2541-03 was formed by extrusion to have a first bolt length of 30 mm diameter adjoining a second bolt length of 34 mm diameter via a taper section. In a deformation stroke, using a drawing matrix with inside indentations, the bolt was extended through 25 mm while reducing its diameter from 34 to 30 mm. In this deformation stroke the bolt continuously absorbed a force in the order of 420-440 kN for the length of the stroke.

Although each application requires its own bolt design and dimensioning the above example still demonstrates the potential in the deformation bolt to operate in the energy absorbing device and method of the present invention.

It should be noted that the energy absorption device of the present invention has wider use beside the shown applications in train couplers and other vehicle connections as presented here merely in order to explain the invention, and without limiting purpose. More precisely, the disclosed energy absorption device and method provides an impact protection and safety arrangement which can be installed in buffers, bumpers, chassis or vehicle bodies, elevators etc., where an exceptional load can accidently be expected in case of an emergency.

One example of the later is shown in FIG. 5, the drawing schematically illustrating the energy absorption device installed as emergency stop 200 in an elevator implementation. In FIG. 5 the bolt 4 is seated in a ring 8 that is secured in an upper end of a mounting bracket 201. The mounting bracket 201 is fixedly attached to a wall 202 of an elevator shaft 203, such that the bolt and ring combination is in this case stationary arranged. The threaded end 6 of the bolt is inserted in a drawing block 204 having an up-turned hook 205 which projects into the elevator shaft, the hook 205 facing the body of a lift cage 206 which is arranged to move in the elevator shaft. A latch 207 is integrated in structural parts 208 of the lift cage, the latch having a down-turned hook 209 facing outwards from the lift cage body. In normal operation the latch 207 is withdrawn into the lift cage structure 208 as illustrated schematically by the broken lines in FIG. 5. In its withdrawn position the latch 207 passes freely the draw block and hook 205 in upwards and downwards travel. In case of an emergency and request for safety stop of the lift cage in downwards travel, the latch 207 is released from its withdrawn position and ejected into engagement with the drawing block, the hooks 205 and 209 engaging to pull the deformation bolt 4 through the ring 8 under plastic deformation of the bolt.

Release and ejection of the latch 207 can be realized in various ways, using for example an accelerometer and an electro-mechanic or explosive device to project the latch. In an elevator implementation a number of energy absorption devices 3 can be installed and vertically spaced in the elevator shaft such that in case of a fall the lift cage only travels a limited length towards the closest positioned device 3 to be engaged.

The claims attached are drafted to define the scope of invention including the embodiments disclosed and modifications and implementations thereof which can be derived from the disclosure.

The invention claimed is:

1. An energy absorption device for absorption of energy released upon impact between two objects in relative motion, the energy absorption device comprising:
   a semi-solid or solid deformation bolt made in a cold-forming process and having a taper section; and
   a hard metal ring having a through hole, the taper section being seated in the through hole of the hard metal ring,
   wherein the deformation bolt is configured to absorb energy from the impact by a diameter reduction of the deformation bolt resultant from the deformation bolt being pulled through the ring when an exceptional load is applied by the impact.

2. The device of claim 1, wherein the deformation bolt comprises a first bolt length having a first diameter adjoining, via the taper section, a second bolt length having a second diameter larger than the first diameter.

3. The device of claim 2, wherein the ring comprises a tapering through hole with an inner mating with the taper section of the deformation bolt.

4. The device of claim 3, wherein the ring comprises a hard metal insert fitted into an insert holder.

5. The device of claim 4, wherein the through hole is in the insert, and the inner surface of the through hole includes at least one radial indentation that extends in axial direction from a mouth in one end of the insert.

6. The device of claim 5, wherein the taper section of the deformation bolt includes at least one radial protrusion that fits into the indentation of the insert.

7. The device of claim 6, wherein the first bolt length, the taper section, and the at least one radial protrusion at the taper section are pre-formed by extrusion.

8. The device of claim 2, wherein the first bolt length of lesser diameter is formed with a threaded portion near an end of the deformation bolt.

9. A coupler intended for coupling rail vehicles which in an interlinked state move together in common motion and direction, comprising:
   at least one combination of a semi-solid or solid deformation bolt made from a material in a cold-forming process and having a taper section, and a hard metal ring having a through hole such that the taper section is seated in the through hole of the hard metal ring,
   wherein the deformation bolt is configured to absorb energy from the impact by a diameter reduction of the deformation bolt resultant from the deformation bolt being pulled through the ring when an exceptional load is applied to the coupler during movement of the rail vehicles.

10. The coupler of claim 9 further comprising:
    a drawbar,
    a pivot bracket and a pivot axle pivotally connecting the drawbar to one of said two vehicles,
    a mounting plate fixedly connected to said one vehicle, the mounting plate having a through hole providing passage for the pivot bracket and the pivot axle in a crash fall,
    wherein the deformation bolt is fixedly mounted in relation to one of the mounting plate and the pivot bracket, and the ring is fixedly mounted in relation to the other one of the mounting plate and the pivot bracket.

11. The coupler of claim 10, wherein the deformation bolt comprises a first bolt length having a first diameter adjoining, via the taper section, a second bolt length having a second diameter larger than the first diameter, and a threaded portion on the first bolt length near the end of the bolt, and further wherein the deformation bolt is secured through a bolt-and-nut connection on a front face of the mounting plate while the taper section and the second bolt length extend on the opposite and rear side of the mounting plate.

12. The coupler of claim 10, wherein the hard metal ring is secured in a yoke which is coupled to the pivot bracket and releasably attached to the rear face of the mounting plate, the yoke holding the hard metal ring in clamped position between the taper section on the deformation bolt and the rear face of the yoke.

13. The coupler of claim 10, wherein the deformation bolt comprises a first bolt length having a first diameter adjoining, via the taper section, a second bolt length having a second diameter larger than the first diameter, and a threaded portion on the first bolt length near the end of the bolt, and further wherein the deformation bolt is secured through a bolt-and-nut connection on a rear face of a yoke which is coupled to the pivot bracket and releasably attached to the rear face of the mounting plate, such that the taper section and the second bolt length extend on the opposite and front side of the mounting plate.

14. The coupler of claim 13, wherein the hard metal ring is secured on the front face of the mounting plate which holds the hard metal ring in clamped position between the taper section on the deformation bolt and the front face of the mounting plate.

15. The coupler of claim 12, wherein the mounting plate and the yoke or the pivot bracket are connected by shear out bolts.

16. The coupler of any of claim 10, wherein at least one combination of the deformation bolt and the hard metal ring is arranged on each opposite sides of the hole for passage of the pivot bracket and axle through the mounting plate upon release of the energy absorption device.

17. The device of claim 1, wherein an inner surface of the through hole includes at least one radial indentation that extends in axial direction from a mouth in one end through hole, and
    wherein the taper section of the deformation bolt includes at least one radial protrusion that fits into the indentation.

18. The device of claim 3, wherein the inner surface of the through hole includes at least one radial indentation that extends in axial direction from a mouth in one end through hole, and
    wherein the taper section of the deformation bolt includes at least one radial protrusion that fits into the indentation.

19. A method for absorption of energy released upon an impact between a first object and a second object in relative motion, the method comprising:
    accelerating a first object relative to a second object in response to an exceptional load being applied to the first object or the second object;
    putting an element or a plurality of elements under stress as a result of the impact; and
    absorbing acceleration energy by deforming the element or the plurality of elements, wherein the element or the plurality of elements include a semi-solid or solid deformation bolt, wherein the deformation bolt is made from a material in a cold-forming process, wherein the deforming comprises a controlled diameter reduction during a forced elongation of the deformation bolt in a direction of force generated in the acceleration, and wherein the controlled diameter reduction is achieved by the deformation bolt being pulled through a ring during the forced elongation.

20. The method of claim 19, comprising:

pre-forming the deformation bolt into a first bolt length having a first diameter adjoining, via a taper section, a second bolt length having a second diameter larger than the first diameter;

providing a hard metal ring with a through hole and an inner diameter, wherein the inner diameter of the ring is shaped to mate with a diameter of the taper section of the deformation bolt;

fixing the ring to a first of two members;

inserting the deformation bolt in the ring until the taper section is seated in the through hole; and fixing the deformation bolt to a second of two members.

21. The of claim 20, further comprising preventing relative rotation between the deformation bolt and the ring by arranging a radial engagement between the taper section of the deformation bolt and the inner diameter of the ring.

* * * * *